Jan. 10, 1967   J. CURLETT   3,296,722
AUTOMATIC CONTROL SYSTEM FOR CONSTRUCTION VEHICLES
Original Filed March 20, 1963   3 Sheets-Sheet 1

INVENTOR.
JOHN CURLETT
BY Edward B. Gregg
ATTORNEY

INVENTOR.
JOHN CURLETT
BY Edward B Gregg
ATTORNEY

United States Patent Office
3,296,722
Patented Jan. 10, 1967
:::

3,296,722
AUTOMATIC CONTROL SYSTEM FOR CONSTRUCTION VEHICLES
John Curlett, Los Gatos, Calif., assignor to Gurries Manufacturing Co., San Jose, Calif., a corporation of California
Continuation of application Ser. No. 266,597, Mar. 20, 1963. This application Mar. 29, 1965, Ser. No. 446,468
7 Claims. (Cl. 37—144)

This invention relates to an automatic control system for construction vehicles, and more particularly to systems for controlling the elevation and cross-slope of working tools for road building machines and the like, including systems for transferring power input from a lift mechanism on one side of the working tool to the lift mechanism on the other side. The present application constitutes a continuation of applicant's co-pending application, Ser. No. 266,597 filed March 20, 1963 and now abandoned.

The automatic elevation and cross-slope system of this invention may be employed in road building and land leveling machinery of a wide variety of types such as scrapers, grading machines, smoothing and leveling machines, agricultural machines and the like. In each of these vehicles there is a main frame and a working tool which is supported on the frame and hydraulic rams, jack screws or similar extensible members are provided in order to raise and lower the working tool or the frame on which it is supported, in order to adjust the elevation of the tool. In certain machines of this type, means have been provided for controlling the elevation of the working tool automatically, as for example in a hydraulic system, a valve may be operated in response to deviation of the working tool from a desired reference elevation as determined by a guide wire or reference surface along the path of vehicle travel.

Various devices have also been provided for controlling cross-slope. In certain of these devices a pendulum is provided to operate a valve, a switch or any other member capable of controlling the power source when the tool inclination deviates from a selected slope.

Efforts have been made to combine automatic controls for both elevation and cross-slope, but such controls usually require considerable additional power to operate the power lift mechanism on one side of the working tool in order to supplement or subtract from the power delivered by the elevation control system. Further, where hydraulic controls are employed, the amount of oil flow delivered to or taken from the hydraulic ram on one side in order to adjust the slope requires slower action of the cross-slope control.

Additionally, the pendulum of such cross-slope control devices is usually placed directly on the tool that is being controlled. However, the placement of the pendulum on the tool may subject it to impact shocks that could produce inadvertent operation, and it sharply restricts the speed with which the tool may be moved. That is, if the tool is tilted at a rate faster than the pendulum can move through its oil bath, the pendulum will be carried with it to cause an over-correction.

It is, therefore, an object of this invention to provide a system for controlling both elevation and cross-slope that operates rapidly and accurately.

It is a further object of this invention to provide a pendulum-operated cross-slope control that need not be mounted directly on the tool being controlled.

The automatic control system of this invention comprises an elevation control system which operates power mechanisms by delivering a quantity of power input in response to the output of a sensor device which cooperates with an external reference surface disposed along the path of vehicle movement, e.g., a grade wire, a rail or a preformed surface. For example, in the case of hydraulic ram tool operating means, the sensor could operate a valve which is moveable in either direction from a normal, closed position to open the hydraulic system to either pressure or return lines to cause extension or retraction of the hydraulic rams. With the valve open there is delivered into the hydraulic system, the quantity of oil necessary to position the working tool at the desired elevation at which point the sensor will close the valve. Then, variations in tool inclination may be produced simply by transferring the pressure fluid from one ram to the other, with little additional power requirement. In such a system, a pendulum operated power input control may be caused to move from a central null position in either direction to drive a motor in a corresponding direction, the motor in turn driving a pump in the appropriate direction to transfer the fluid from one hydraulic ram to the other. Thus, one ram will be raised and the other lowered so that each ram is moved only one-half the amount a single ram on one side would. Additionally, the only further power requirement is that necessary to overcome friction and the relatively small difference in load between rams.

As an additional feature of this invention, the pendulum control may be mounted on the vehicle frame rather than on the tool and the power input control is operated disjunctively by the pendulum and by a feedback increment transmitted from the tool in response to slope movement. Thus, movement to the correct tool slope will overcome pendulum operation despite continued frame slope error.

Other objects and advantages of this invention will become apparent from the specification following when read in conjunction with the accompanying drawings wherein.

Figure 1:
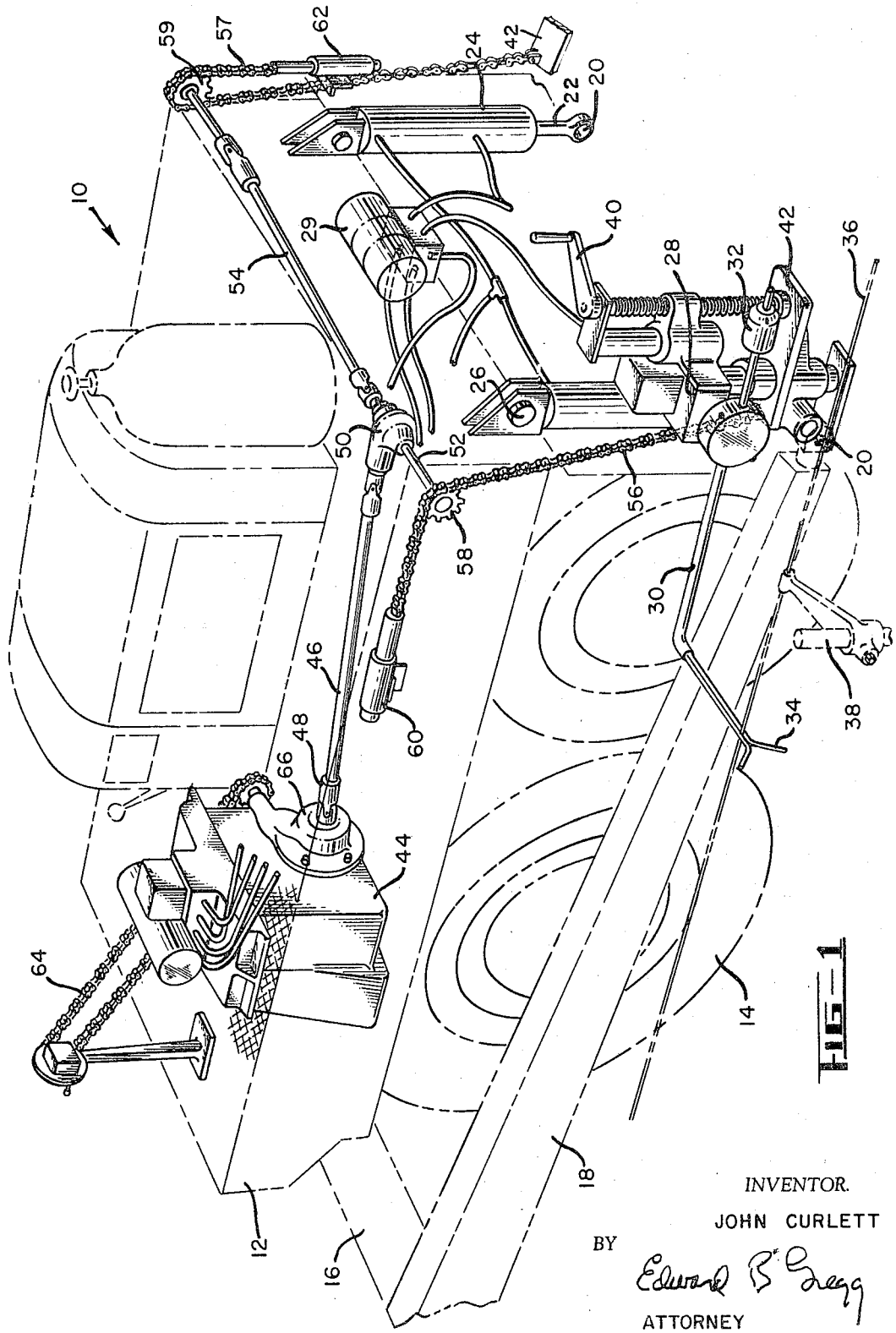
FIG. 1 is a view in perspective of a road building vehicle incorporating the automatic control system of this invention.

Referring now to the drawings, and particularly to FIG. 1 thereof, there is shown a construction machine 10 comprising a main frame 12 mounted upon suitable traction means such as the wheels 14 illustrated. The control system of this invention is applicable to control a wide variety of working tools, but in the illustration shown there is provided a leveling and smoothing device 16 carried on the end of arms 18 which are pivotally mounted to swing about pivot points 20. The position of the leveling device 16 bears a fixed relation to the position of the pivot points 20 so that control of the pivot points 20 will inherently produce control of the leveling device. In the machine shown, the pivot points 20 are carried on the lower end of the piston rods 22 of the hydraulic rams 24 secured at 26 to the main frame 12 so that extension and retraction of the hydraulic rams will result in a raising and lowering of the pivot points 20. As the pivot points 20 are changed, the angular disposition of the arms 18 and leveling device 16 are varied temporarily, but the latter readjusts itself automatically to establish a new leveling plane at a lower or higher level, as the case may be. Such action is well known in the art, in and of itself, forms no part of the present invention. An exemplary arrangement of this type is described in U.S. Patent No. 3,029,715 to which reference is made for details of its structure and operation.

Figure 2:
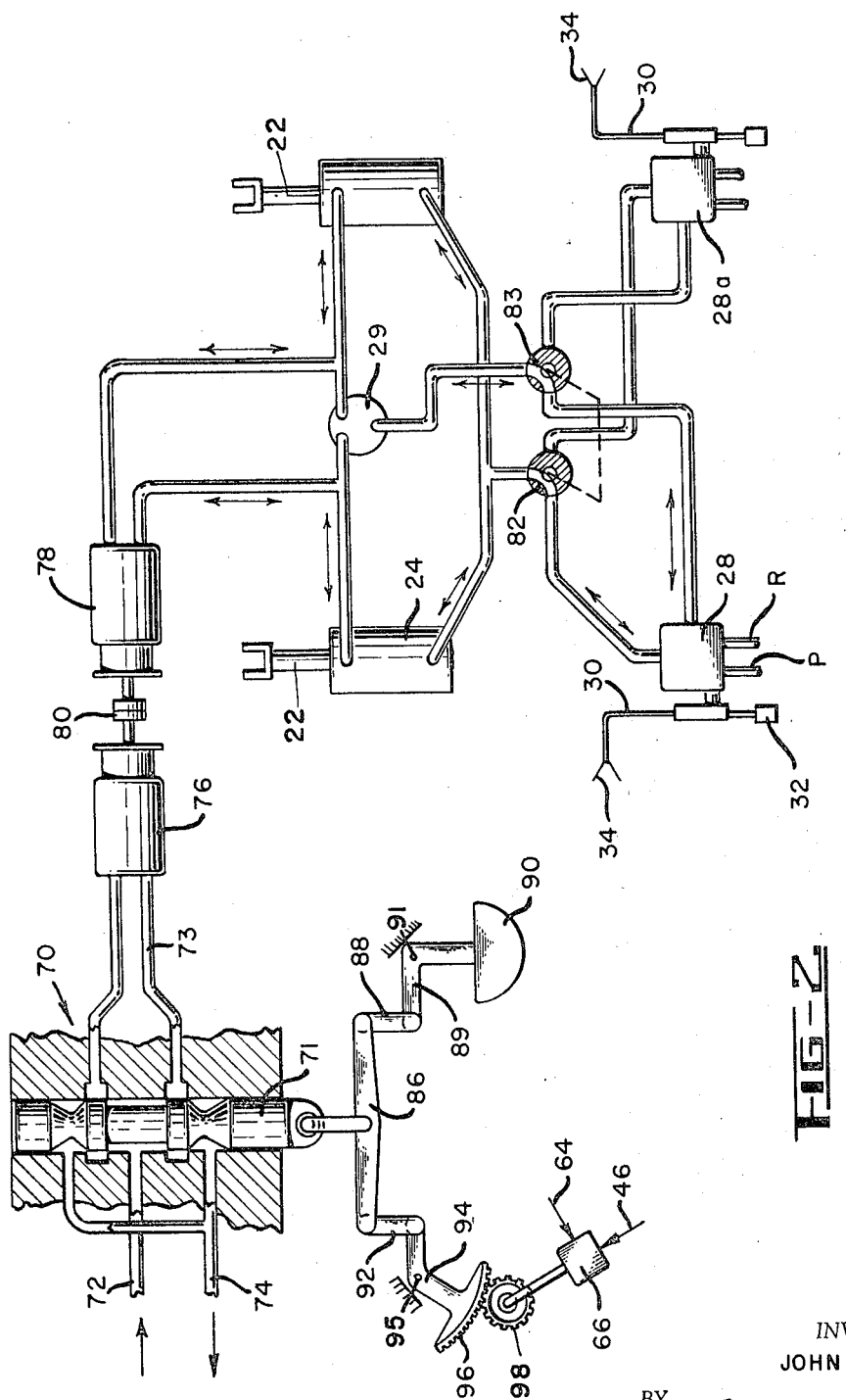
FIG. 2 is a schematic diagram of a preferred form of hydraulic control system.

The pivot points 20 may be raised and lowered automatically by operation of a control valve 28 (FIG. 2), such as a four-way valve of conventional nature and corresponding to valve 70 in FIG. 2, such valve being moveable in either direction from a central neutral position to direct the flow of hydraulic fluids in the lines as indicated by arrows in FIG. 2 to extend or retract the hydraulic rams 24. For example, when it is desired to lower the working tool 16 the four-way valve 28 may be operated to open the upper ends of the hydraulic rams 24 to pressure fluid P and the lower ends to the return lines R so that the rams 24 will be driven down to carry the pivot points 20 with it. In conjunction with this system, a suitable flow divider 29 such as that described in Patent No. 3,000,122 is provided to insure to insure that fluid flow to and from both of the cylinders is uniform so that each ram 24 will be extended or retracted in equal amounts.

The four-way valve 28 may be operated by means of a sensor device comprising an arm 30 pivotally carried on the valve body directly to operate the four-way valve, the arm preferably being counter-weighted at 32 so that it normally maintains desired neutral position balance, the arrangement being substantially as described in copending patent application, Ser. No. 198,392, now United States Patent No. 3,142,915. The outer end of the arm may be bifurcated at 34 to ride over a grade wire 36 (FIG. 1) carried on suitable posts 38 so that as the vehicle moves along the path of travel the valve will be maintained in its neutral closed position as long as the arm 30 is at the desired height with respect to the grade wire 36. Since the arm 30 is mounted to move with the pivot mountings 20, the deviation of the arm from the desired height indicates corresponding deviation of the working tool. The initial position of the sensor device can be established by means of a crank 40 which may be turned manually to adjust the height of the valve 28 and sensor device 30 relative to plates 42 on the arms 18 to assume a neutral position at the desired height of the tool being controlled.

The cross-slope assembly may be contained in a housing 44 mounted on the main frame 12 and preferably includes a pendulum-controlled source of power like that disclosed in detail in Patent No. 2,934,078 which operates the hydraulic rams 24 in response to deviation of the frame from a desired cross-slope to correct the slope. Working in opposition to the cross-slope control 44 is a feed-back transmitting shaft 46 which delivers motion produced by the correcting movement of the working tool, or pivot points in this case, to inactivate the power source when correction is achieved. The feed-back transmitting shaft 46 may include suitable universal members 48 and operates to transmit rotation delivered from a differential gear arrangement 50 connected between two feed-back input shafts 52, 54 which are driven in opposite directions by unidirectional movement of the opposite ends of the controlled working tool. Thus, if both sides of the working tool are raised equal amounts the shafts 52 and 54 will rotate in opposite directions equal amounts and there will be no output at the differential gear 50 to the shaft 46. By the same token, any difference in the amount of movement between the opposite sides of the working tool will result in an output at the differential gear which is transmitted through the shaft 46 to the cross-slope control.

The feed-back system may take a variety of forms but preferably comprises chains 56 and 57 secured at their lower ends to the plates 42 on the arms 18 and trained in opposite directions about sprockets 58 and 59 on the feed-back shafts 52 and 54 to drive the sprockets in opposite directions. A spring or other suitable tension means shown generally at 60 and 62 on the main frame 12 bias the chains in full tension away from the working tool.

Thus, a pendulum in the housing 44 will detect a deviation in slope of the frame 12 from a desired reference and, as will be described, a power source is actuated to operate the hydraulic rams in directions to correct the slope of the working tool measured from the mountings 20. The correcting movement of opposite sides of the working tool will necessarily be differential resulting in an increment of rotation being transmitted by the feed-back delivery shaft 46 in opposition to the operation of the pendulum until, when correction is complete, the power source is inactivated.

A manually operated drive mechanism 64 is provided for controlling the power source so that the initial setting may be chosen from the operators seat. The manual control 64 may comprise simply a chain and sprocket drive connected through a differential 66 to the feed-back delivery shaft 46 to control operation of the power source in a direction opposite to that of the pendulum control as will be described.

Referring now to FIG. 2, the power controlling member may comprise a four-way valve 70, including a spool 71 that is moveable in either direction from the neutral position shown to open the fluid lines 73 of a hydraulic motor system selectively to the pressure or return lines 72 and 74 of a constant pressure hydraulic system. It is to be noted that the spool 71 may be contoured so that the forces of fluids moving in opposite directions are balanced. This is a particular advantage of systems using a four-way valve open selectively to bi-directional flow.

When the valve is moved a given direction, the hydraulic motor 76 will be caused to be driven in a corresponding direction so that a hydraulic pump 78 connected to the motor by suitable coupling 80 will circulate the fluid in the hydraulic ram system from one hydraulic ram 24 to the other.

The amount of hydraulic fluid originally delivered to the system is determined by the side tracer servo valve 28 which is open from a neutral closed position by operation of the sensor arm 30 as previously described. A pair of manually operated selector valves 82, 83 are provided so that either one or the other of the side tracer servos 28 or 28a may be activated. Assuming that the servo tracer on the left is the activated one, as shown, operation of that valve 28 will permit fluid to flow according to the alignment of the pressure and return lines until the desired elevation of the hydraulic rams 24, and hence the working tool, is achieved with the flow of fluid being through the flow divider 29 so that hydraulic rams are operated equally. Then, with the fluid thus introduced into the system operation of the hydraulic pump 78 merely transfers the fluid from one hydraulic ram 24 to the other without increasing the pressure substantially. Since the slope of the working tool is varied by extending one hydraulic ram 24 while the other is retracted the stroke of each is only one-half of that required by correcting through only one of the cylinders. It is to be noted also that while double acting rams are shown in FIG. 2 the fluid transfer system here described is equally applicable to single acting cylinders.

One system for operating the four-way valve 70 is illustrated in FIG. 2 and comprises a differential lever 86 pivotally connected at one end by means of a link 88 to an arm 89 carried on a pendulum 90 suspended from a fixed pivot 91 so that oscillation of the pendulum indicating a change in slope will raise or lower one end of the differential lever to raise or lower the spool 71, connected to the center of the lever, from its neutral, closed position. The other end of the differential lever 86 is pivotally connected by means of a link 92 to a bell crank lever 94 which is pivoted about a fixed point 95 in response to input from the feed-back control. One means of accomplishing this would be to provide a gear segment 96 on the bell crank lever 94 as shown and drive the bell crank lever by means of a pinion 98 carried on the input shaft to which the manual drive mechanism 64 and feed-back shaft 46 are connected by means of the differential gears 66. The system is arranged so that feed-back input will work in the direction opposite to that of the pendulum control, and corrective movements of the working tool will nullify the output of the pendulum which actually reflects deviation slope of the frame 12 rather than the working tool 16, 18.

Figure 3:
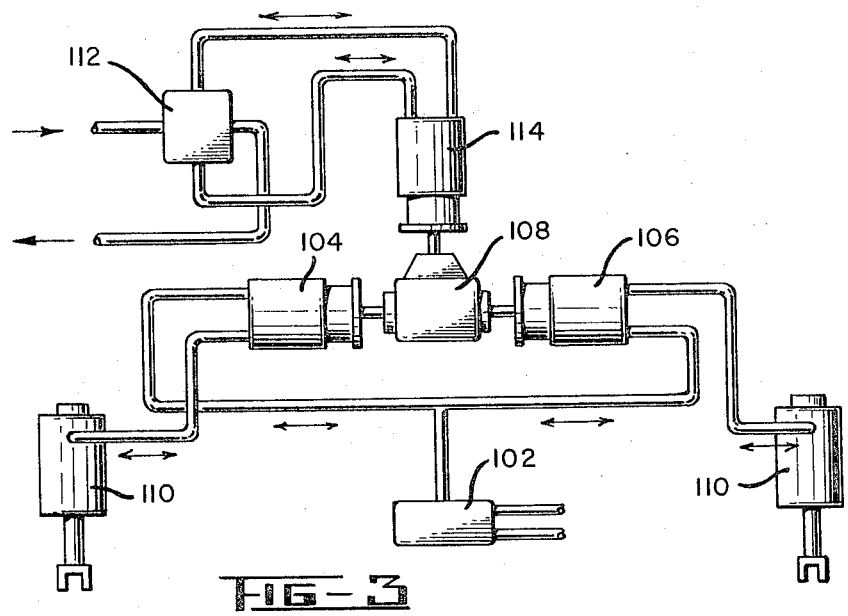
FIG. 3 is a schematic illustration of an alternative fluid control system.

In the system shown in FIG. 3, operation of the side tracer servo 102 produces bi-directional fluid flow as in FIG. 2 so that the flow is divided by operation of a pair of fluid pump motors 104, 106 carried on shafts between which is interposed a gear differential 108. Thus, with the differential inactive the fluid drives the motors at equal rates and, in turn, the pump motors 104, 106 deliver fluid in equal quantities to extend or retract the hydraulic rams 110 in equal amounts. In conjunction with this system there is provided a four-way pendulum servo 112 similar to that shown in FIG. 2 which operates in response to deviations from a desired slope to cause fluid flow in the desired direction to drive a fluid motor 114 in a corresponding direction. The fluid motor will deliver an input to the gear differential 108 to increase the rotation of one fluid pump and decrease the rotation of the other, thus producing greater flow of fluid to one hydraulic ram and reducing the flow to the other. If the fluid pumps are initially idle after the rams are in positions established by the elevation control, operation of the transfer fluid member 114, 108 will merely produce flow from one hydraulic ram to the other.

Figure 4:
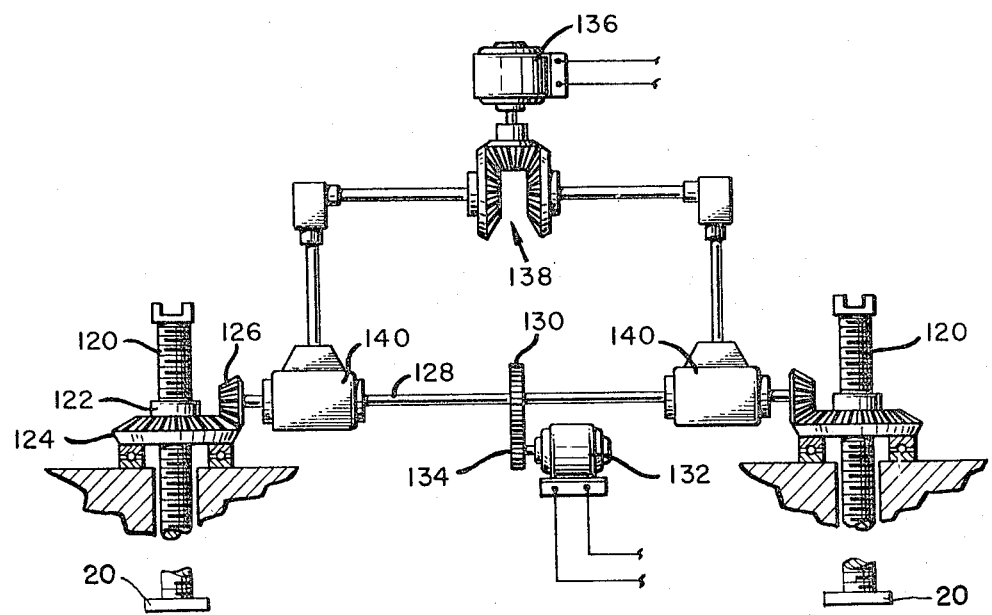
FIG. 4 is a schematic diagram of an alternative mechanical control system.

In FIG. 4, there is shown a mechanical drive for accomplishing cross-slope control. There, a pair of jack screws 120 which are secured to the working tool pivot points 20 are engaged by nuts 122 on which are formed bevel gears 124 driven by suitable pinions 126 carried on the ends of a shaft 128. On the shaft is secured a gear 130 driven by a motor 132 through a second gear 134 and adapted to be operated from the blade height sensor unit 102. Thus, the sensor unit could be moved from a neutral position to close a switch in either direction and drive the motor in corresponding direction. Similarly, a pendulum sensing unit may control a current to a transfer motor 136 which operates a split-path bevel gear 138 to produce rotation of shafts in opposite directions. Then, suitable differential gears 140 are provided to introduce relative rotation of the shafts in opposite directions to add to or subtract from the movement produced by the elevation control.

While this invention has been described in conjunction with preferred embodiments thereof, it is to be understood that modifications and changes therein may be made by those skilled in the art within the spirit and scope of this invention which is to be defined by the claims appended hereto.

What is claimed is:

1. A control system for a construction vehicle having a working tool frame adapted for vertical adjustment relative to the vehicle frame which system comprises means including a pair of extensible members connected between the vehicle frame and the working tool frame at laterally spaced portions thereof for individually adjusting the respective sides of the working tool frame, a first sensing means operative to energize said extensible members simultaneously in the same direction to vary the elevation of the working tool frame, and a second sensing means operative to automatically energize said extensible members simultaneously in opposite directions to vary the cross-slope of the working tool frame.

2. A control system according to claim 1 in which said first sensing means for controlling said elevation-varying means includes a sensing member supported from the working tool frame and adapted to engage a reference surface disposed along the path of vehicle travel.

3. A control system according to claim 1 in which said second sensing means for controlling said cross-slope varying means includes a pendulum suspended from the vehicle frame, and feed-back means connected between the working tool frame and said control means to inactivate the latter when the working tool frame has attained a predetermined cross-slope disposition.

4. A control system according to claim 1 wherein said extensible members are jack screws.

5. A control system according to claim 1 wherein said extensible members are hydraulic rams and said elevation varying means includes a hydraulic pressure system arranged to deliver equal amounts of hydraulic fluid to said rams.

6. A control system according to claim 5 wherein said cross-slope varying means includes a pump connected to transfer hydraulic fluid from one of said rams to the other.

7. A control system for a construction vehicle having a working tool frame adapted for adjustment relative to the vehicle frame which system comprises means including a pair of extensible members connected between the frame and the working tool frame at laterally-spaced portions thereof for individually adjusting the respective sides of the working tool frame, sensing means operative to automatically energize said extensible members in opposite directions to vary the cross-slope of the working tool frame, means for controlling said cross-slope varying means including a pendulum suspended from the vehicle frame, and feed-back means connected between the working tool frame and said control means to inactivate the latter when the working tool has attained a predetermined cross-slope disposition, said feed-back means including a pair of feed-back shafts connected to the sides of the working tool frame so as to rotate in opposite directions in response to adjustment of the working tool frame, a differential gear unit connected to said shafts, and a control input shaft connected between said differential gear unit and said control means whereby said control shaft rotates only in response to variation in the cross-slope of the working tool frame.

References Cited by the Examiner

UNITED STATES PATENTS

| | | | |
|---|---|---|---|
| 2,190,346 | 2/1940 | Austin | 37 |
| 2,310,930 | 2/1943 | Blanchett | 280—6.1 |
| 2,524,005 | 10/1950 | Hurbert | 172—465 X |
| 2,636,290 | 4/1953 | Bell | 37 |
| 2,756,062 | 7/1956 | Thixton | 280—6.1 |
| 2,775,831 | 1/1957 | Rockwell | 37—144 |
| 2,934,078 | 4/1960 | Gurries et al. | 37—180 X |
| 3,008,724 | 11/1961 | Lapins et al. | 280—6.1 |
| 3,094,796 | 6/1963 | Atchley | 37—156 |

ABRAHAM G. STONE, *Primary Examiner.*

JOE O. BOLT, WILLIAM A. SMITH III, *Examiners.*